United States Patent
Grinberg et al.

(10) Patent No.: US 6,741,762 B2
(45) Date of Patent: May 25, 2004

(54) BACK BIASED ELECTRO-OPTICAL MODULATOR

(75) Inventors: Jan Grinberg, Los Angeles, CA (US); Min-Cheol Oh, Glendale, CA (US); Harold R. Fetterman, Santa Monica, CA (US); Joseph Michael, Los Angeles, CA (US)

(73) Assignee: Pacific Wave Industries, Inc., El Segundo, CA (US)

( * ) Notice: Subject to any disclaimer, the term of this patent is extended or adjusted under 35 U.S.C. 154(b) by 0 days.

(21) Appl. No.: 10/010,401

(22) Filed: Dec. 5, 2001

(65) Prior Publication Data

US 2003/0103709 A1 Jun. 5, 2003

(51) Int. Cl.$^7$ .............................. G02F 1/035; G02B 6/10
(52) U.S. Cl. ........................... 385/2; 385/131; 359/245; 359/254
(58) Field of Search ........................ 385/2, 3, 8, 129–132; 359/245, 246, 252, 254, 255, 279, 315, 321; 252/582, 583

(56) References Cited

U.S. PATENT DOCUMENTS 5,892,859 A * 4/1999 Grote .............................. 385/2
6,067,186 A 5/2000 Dalton et al.
6,348,992 B1 * 2/2002 Zhang et al. ............... 359/321
6,522,793 B1 * 2/2003 Szilagyi et al. ................ 385/2

* cited by examiner

Primary Examiner—Gerard R. Strecker
(74) Attorney, Agent, or Firm—Benman, Brown & Williams (57) ABSTRACT

An electro-optical modulator and a method for biasing a Mach-Zehnder modulator. The inventive modulator includes a layer of material at least partially transparent to electromagnetic energy. A first conductive layer is disposed on a first surface of the layer of at least partially transparent material. A second conductive layer is disposed on a second surface of the layer of at least partially transparent material. A layer of insulating material is disposed on the second conductive layer and a third conductive layer is disposed on the layer of insulating material. In the illustrative application, the modulator is a Mach-Zehnder modulator. A biasing potential is applied to the second conductive layer of the modulator and a modulating voltage is applied across the first and the third conductive layers.

3 Claims, 6 Drawing Sheets

BACK BIASED ELECTRO-OPTICAL MODULATOR

BACKGROUND OF THE INVENTION

1. Field of the Invention

The present invention relates to fiber optic devices used for communication and other applications. More specifically, the present invention relates to electro-optical modulators.

2. Description of the Related Art

Optical fibers are widely used for communication and other applications. Inasmuch as optical fibers offer high bandwidth at low cost, they facilitate the communication of large amounts of data inexpensively. Currently, optical systems must inevitably interface to electrical systems at the inputs and outputs thereof. Over the years, many devices have been developed to facilitate the electrical to optical transition and vice versa. For example, electro-optical modulators have been developed to effect a conversion of electrical signals to optical signals.

Presently, much effort in the art is focused at the high frequencies to further increase system bandwidth and capacity. At very high frequencies (>10 gigahertz (GHz)), traveling wave electro-optical modulators are often employed. In certain traveling wave modulators, a microstrip is disposed on an optical fiber. This allows an electrical waveform to travel in an electrical channel in the microstrip along with an optical waveform that travels in an optical channel in the optical waveguide. A particularly advantageous traveling wave modulator is known in the art as a Mach-Zehnder configuration.

As discussed in detail below, in a conventional Mach-Zehnder structure, data (electrical signals) comes in through a microstrip transmission line. It is then split into two electrodes; each one positioned directly on top of an optical waveguide. The electrical field, encoded with data, changes the index of refraction through an electro-optic effect in the optical waveguide below. In one implementation the dipoles in the two waveguides are arranged in opposite orientations during the fabrication process. Consequently, by applying same electrical signal to both arms, their refractive indices are changed in opposite directions. In one arm the refractive index increases, while in the other arm it decreases.

In another implementation the dipoles in the two waveguides are arranged in the same orientations during the fabrication process. In this case the modulating signal in the two arms has complementary polarities. Therefore, also in this case the refractive indices are changed in the opposite directions.

In both implementations a constant intensity laser beam is split into the two optical waveguides whose refractive indices are modulated. In one arm the light speeds up while in the other the light slows down. This creates a phase differential between the two optical signals. Consequently, when these two light beams are brought together, they interfere with each other and the combined intensity is amplitude modulated with the input data. Thus, an electrical modulation is converted to a phase modulation and the phase modulation results in an amplitude modulation of the output beam.

In practice, Mach-Zehnder operation is set up by configuring the device so that when no input signal is applied, the output light is at one of three levels: a) minimum, b) maximum, or c) a so-called 'quadrature point'. The minimum output light operating point is achieved when the light coming from the two arms of the modulator are combined with phase difference of 180 degrees. This operating point provides maximum signal-on to signal-off ratio. The maximum output light operating point is achieved when the phase difference is zero and the quadrature operating point is achieved when the phase difference is 90 degrees. At this operating point maximum signal linearity is achieved and therefore, the quadrature point is selected when the signal linearity is important.

In all case, Mach-Zehnder device configuration requires an effective adjustment of the optical length of one arm relative to the other on the order of a fraction of a wavelength, i.e., on the order of a micron or less. Inasmuch as this is impractical in the physical domain, it is generally effected electrically via a direct current (DC) bias adjustment. The bias voltage is applied to one or both arms in such a manner as to create the specified optical path length differential between the two arms. Two methods are currently predominantly used in the art to establish a desired DC bias for Mach-Zehnder type traveling wave electro-optical modulators.

As discussed more fully below, in accordance with a first method, a DC bias voltage (Vb) is combined with a modulating signal (Vm) by means of two capacitors (C) and an inductor (L). The purpose of the capacitors is to prevent very large DC current flow through the terminating resistors Ro and the purpose of the inductor is to avoid a shorting of the modulating signal (Vm) through a low impedance of a DC power supply, Vb.

The problem with this approach is that the large capacitors and inductor required have relatively high parasitic components, which increase the impedance of the capacitors, reduces the impedance of the inductor and creates undesired resonances. Therefore, this arrangement is used primarily when the modulating signal (Vm) is limited to relatively low frequencies (F<10 GHz).

In accordance with a second conventional method for biasing Mach-Zehnder modulators, the modulator includes two separate sections. One section is an RF modulator as in the first method. A second separate section provides for a bias setting. This approach, however, while avoiding the problems of the first approach, introduces another drawback. Namely the total optical path that the optical beam travels in the polymer is substantially longer and therefore the insertion losses are also substantially higher than in the first approach.

Hence, a need remains in the art for an improved system or method for biasing traveling wave electro-optical modulators operating at high frequencies. Specifically, a need remains in the art for an improved system or method for biasing Mach-Zehnder traveling wave electro-optical modulators which offers minimal parasitic inductive and capacitive effects and minimal insertion loss while operating at high frequencies.

SUMMARY OF THE INVENTION

The need in the art is addressed by the electro-optical modulator and the method for biasing a Mach-Zehnder modulator of the present invention. The inventive modulator includes a layer of material at least partially transparent to electro-magnetic energy. A first conductive layer is disposed on a first surface of the layer of at least partially transparent material. A second conductive layer is disposed on a second surface of the layer of at least partially transparent material. A layer of insulating material is disposed on the second conductive layer and a third conductive layer is disposed on the layer of insulating material. In the illustrative application, the modulator is a Mach-Zehnder modulator. A biasing potential is applied to the second conductive layer of the modulator and a modulating voltage is applied across the first and the third conductive layers.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
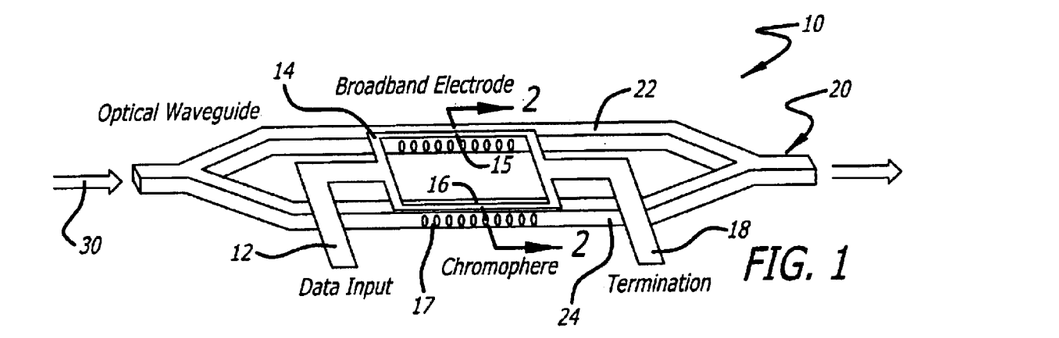
FIG. 1 is a diagram showing an illustrative embodiment of a so called push-pull Mach-Zehnder modulator.

FIG. 1 is a diagram showing an illustrative embodiment of a Mach-Zehnder modulator implemented in accordance with the teachings of U.S. Patent entitled Class Of High Hyperpolarizability Organic Chromophores And Process For Synthesizing The Same, U.S. Pat. No. 6,067,186, issued May 23, 2000, by Pacific Wave Communications, the teachings of which are incorporated herein by reference.

Figure 1A:
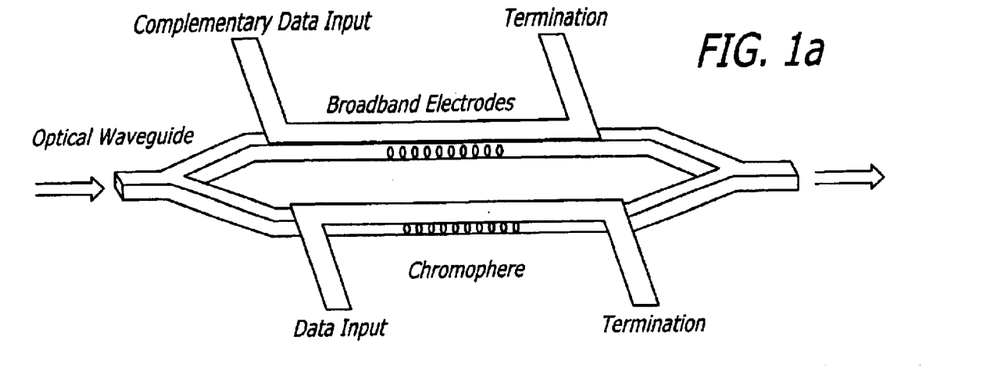
FIG. 1a is a diagram showing an illustrative embodiment of a so complementary Mach-Zehnder modulator.
Figure 2:
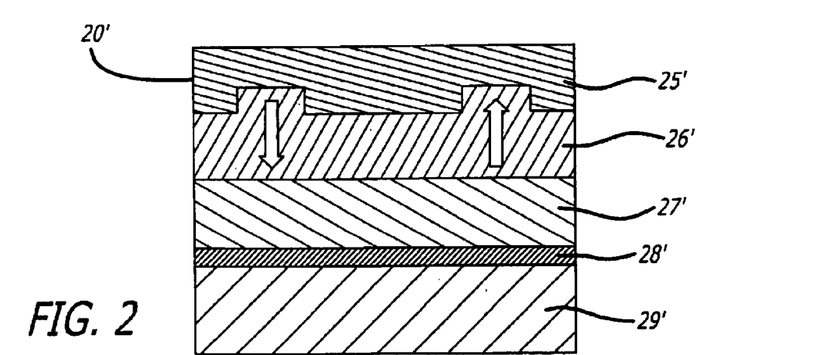
FIG. 2 is a sectional end view of a first implementation of the modulator depicted in FIG. 1 taken along the line 2—2 thereof.

FIG. 1a is a diagram showing a conventional complementary illustrative embodiment of a Mach-Zehnder modulator FIG. 2 is a sectional end view of a first implementation of the modulator depicted in FIG. 1 taken along the line 2—2 thereof. As illustrated in FIGS. 1 and 2, the modulator 10 includes an optical wave-guide 20 over which two electrodes 14 and 16 are disposed over first and second split paths 22 and 24 thereof. The electrodes 14 and 16 are fed by a microstrip transmission line 12. A termination is provided at 18.

In operation, input data is provided through the microstrip transmission line 12. The input electrical signal is then split into the two the electrodes 14 and 16, each of which is disposed directly on top of an associated arm 22 and 24, respectively, of the optical waveguide 20. The electrical field, encoded with data, changes the index of refraction through electro-optic effect in the optical wave-guides 22 and 24. Because the chromophores 15 and 17 in the two waveguides 22 and 24 are arranged in opposite orientations during the fabrication process, their refractive indices are changed in opposite directions. (As is known in the art, chromophores are electro-optical non-linear molecules. See for example, U.S. Pat. No. 6,067,186, the teachings of which are incorporated herein by reference.)

Next, a constant intensity laser beam 30 is split into the two optical waveguides 22 and 24 whose refractive indices are now modulated and different. In one arm, the light speeds up while in the other the light slows down. This creates a phase differential between the two optical signals. Consequently, when these two light beams are brought together, they interfere with each other and the combined intensity is amplitude modulated with the input data. Thus, an electrical modulation is converted to a phase modulation of the two light beams and the phase modulation results in an amplitude modulation of the output beam.

As shown more clearly in FIG. 2, in accordance with conventional teachings, the optical wave-guide 20' is a sandwich structure with an upper cladding 25', a core 26' and a lower cladding 27'. The upper and lower claddings may be fabricated with a UV curable polymer while the core may be fabricated with an active polymer incorporating an NLO (non-linear organic molecules) chromophore. This structure is disposed on a microstrip ground plane 28' that, in turn, is disposed on a silicon substrate 29'.

As mentioned above, optimal Mach-Zehnder device operation requires a biasing arrangement by which an effective adjustment in the length of one arm is made relative to the other on the order of a fraction of a wavelength, i.e., on the order of a micron or less. Inasmuch as this is impractical in the physical domain, it is generally effected electrically via a direct current (DC) bias adjustment. The bias voltage is applied to one or both arms in such a manner as to create the specified optical path length differential between the two arms. Two methods are currently predominantly used in the art to establish a desired DC bias for Mach-Zehnder type traveling wave electro-optical modulators.

Figure 3:
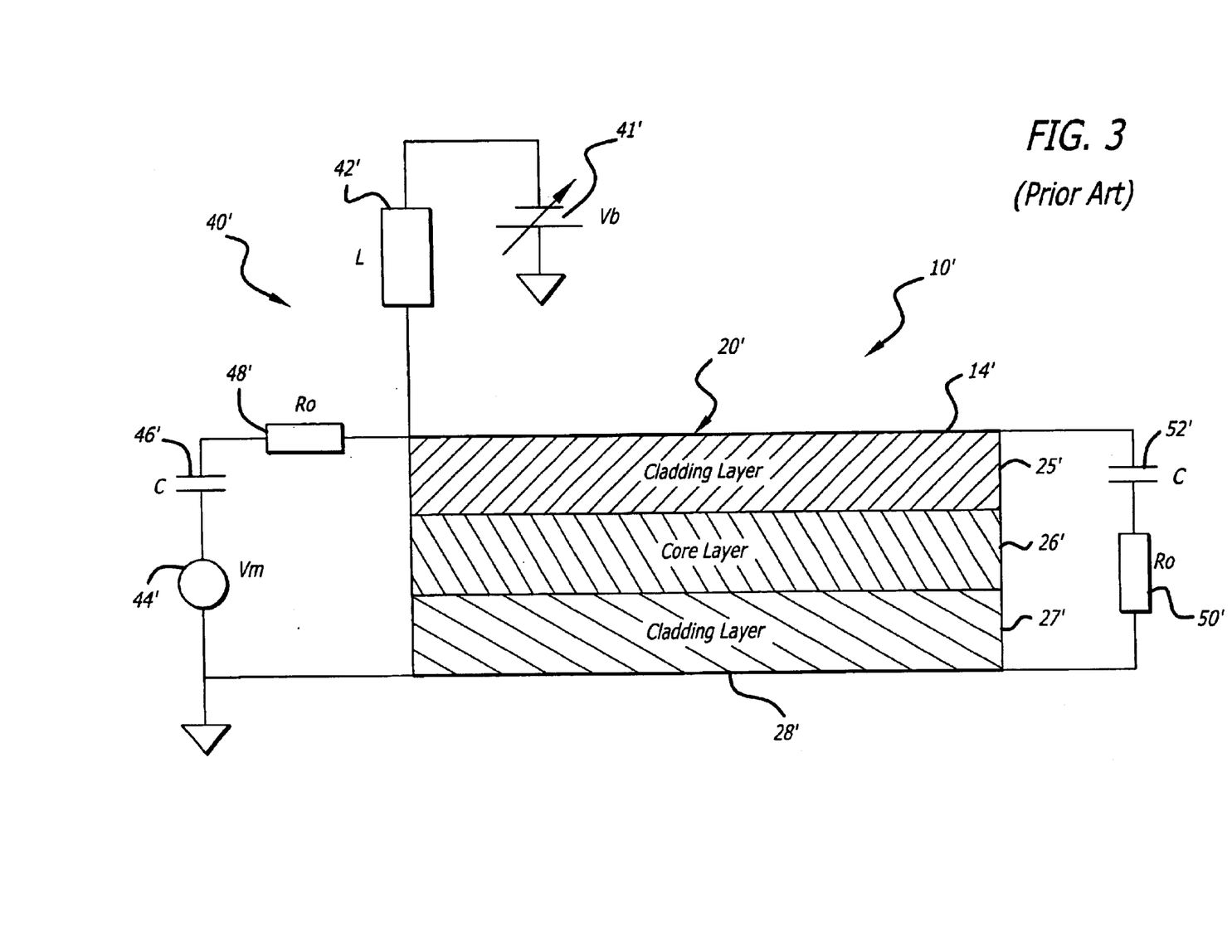
FIG. 3 shows a cross-section of a Mach-Zehnder modulator with a biasing circuit shown schematically and implemented in accordance with a first method known in the art.

FIG. 3 shows a cross-section of a Mach-Zehnder modulator with a biasing circuit shown schematically and implemented in accordance with a first method known in the art. The biasing circuit 40' includes a bias supply 41', an inductor 42', a signal source 44', blocking capacitors 46' and 52', and terminating resistors 48' and 50'. To provide an optimal operating point, a DC bias voltage Vb is applied to the electrodes 14' and 16' (16' not shown) by the bias power supply 41' through the inductor 42'. A modulating voltage Vm is applied across the electrodes 14' and 16' and the ground plane 28' by the signal source 44' through the capacitor 46' and the terminating resistor 48'. The second resistor 50' and the second capacitor 52' are connected in series with the electrodes and the ground plane of the device 28'. The capacitors 46' and 52' serve to ensure that the bias voltage Vb is not shorted to ground via the matching resistors 48' and 50'. Likewise, the inductor 42' serves to block a short of the modulating voltage Vm to ground via the bias power supply 41'.

This device has been found to perform adequately at relatively low frequencies, i.e., frequencies below 8 GHz. The problem with this design is that usually the signal Vm requires a very broad bandwidth device. Therefore, the capacitors and the inductor have to perform well from a relatively low frequency (<100 MHz) to a very high frequency (40 GHz). As a typical matching resistance is quite low (50 Ohm), the task is even more difficult as those skilled in the art will appreciate that one needs to meet the requirement of $2\pi fCcRo>>1$, where f is the low frequency limit. Inasmuch as the frequency 'f' is low and the resistances 48' and 50' are low, the capacitances 46' and 52' must be relatively very large. At the same time the inductor 42' must provide a high impedance path for the low frequency signal ($2\pi fL>>Ro$), therefore the inductor 42' must be also large. The problem is that large capacitors and inductors have relatively high parasitic components, which increase capacitor and decrease inductor impedances and create undesired resonances. Therefore, this arrangement is used primarily when the modulating signal (Vm) is limited to relatively low frequencies (F<10 GHz).

Figure 4:
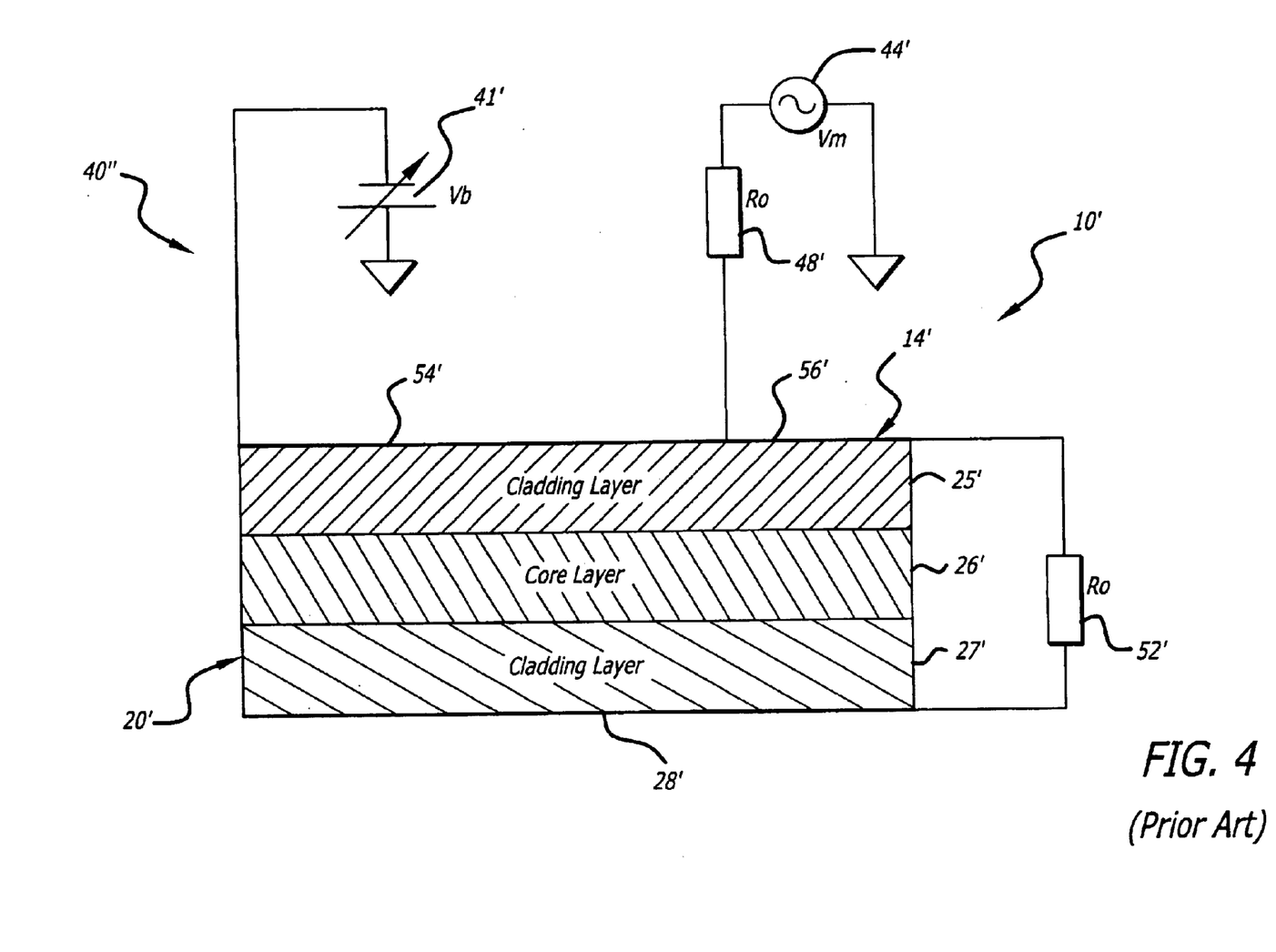
FIG. 4 shows a cross-section of a Mach-Zehnder modulator with a biasing circuit shown schematically and implemented in accordance with a second method known in the art.

FIG. 4 shows a cross-section of a Mach-Zehnder modulator with a biasing circuit shown schematically and implemented in accordance with a second method known in the art. In this embodiment, the biasing circuit 40" is essentially the same as the biasing circuit 40' of FIG. 3 with the exception that the reactive elements are eliminated. The circuit 40" provides modulating and bias voltages, Vm and Vb, which are applied to separate sections 54' and 56', respectively. These two electrodes disposed on the first cladding layer 25', replace the electrode 14' in the previous implementation. Inasmuch as the reactive elements are eliminated, this arrangement works well at high frequencies. However, it suffers from high optical insertion loss, because the length of the device is effectively longer. These losses have to due with the degree of absorption of optical energy propagating in the core layer.

Consequently, a need has remained in the art for an improved system or method for biasing traveling wave electro-optical modulators operating at high frequencies. Specifically, a need has remained in the art for an improved system or method for biasing Mach-Zehnder traveling wave electro-optical modulators which offers minimal parasitic inductive and capacitive effects and minimal insertion loss while operating at high frequencies.

The present invention addresses the need in the art for an improved system or method for biasing traveling wave electro-optical modulators operating at high frequencies. Specifically, the present invention provides an improved system and method for biasing Mach-Zehnder traveling wave electro-optical modulators which offers no parasitic inductive and capacitive effects and minimal insertion loss while operating at high frequencies.

Figure 5:
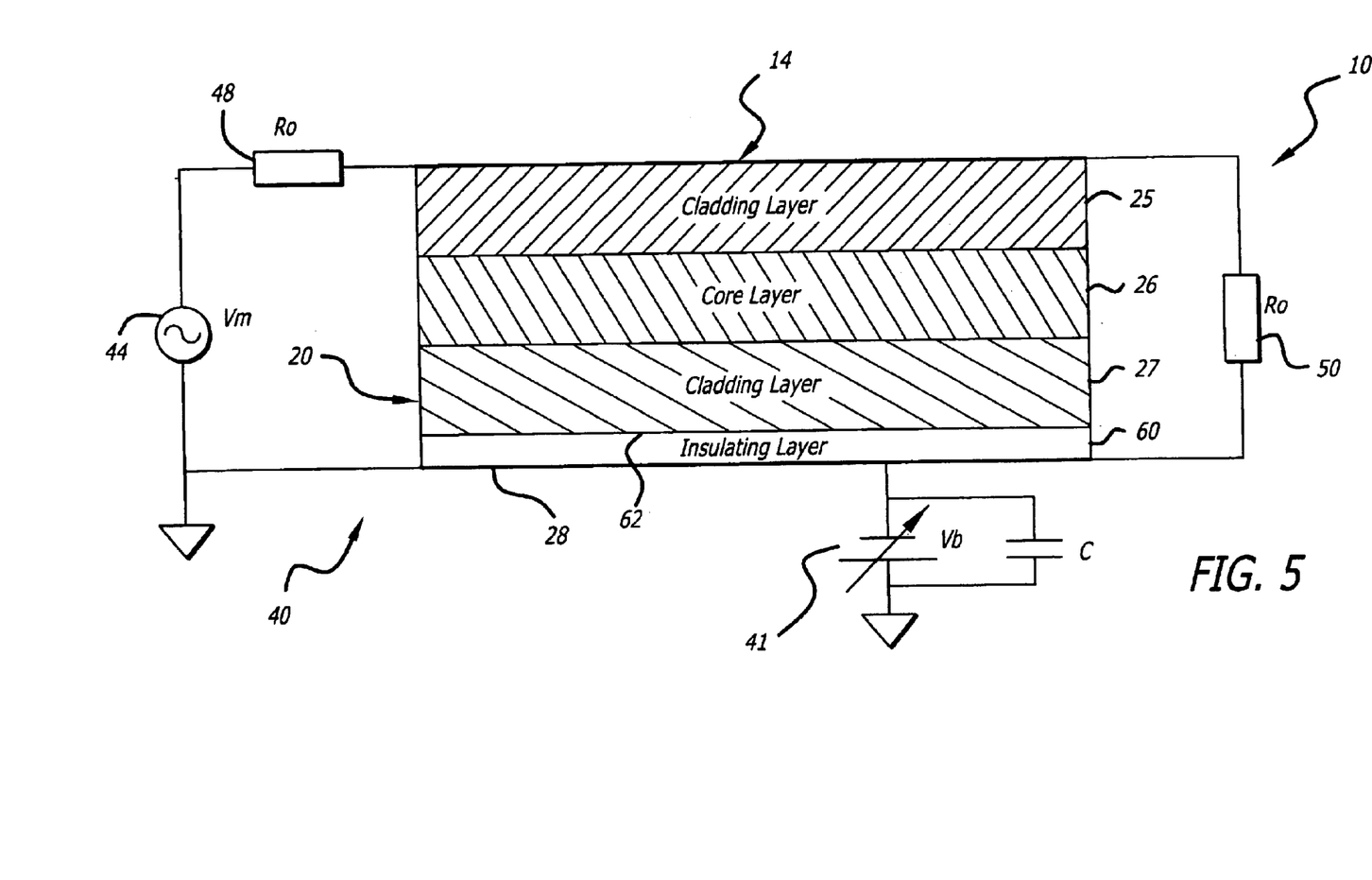
FIG. 5 is a diagram showing a cross-sectional view diagram of an electro-optic modulator, along with a schematic diagram of a biasing circuit therefor, in accordance with the teachings of the present invention.

FIG. 5 is a diagram showing a cross-sectional view of an electro-optical modulator, along with a schematic diagram of a biasing circuit therefor, in accordance with the teachings of the present invention. As shown in FIG. 5, in accordance with the present invention, an insulating layer 60 and a second conductive layer 62 is provided between the ground plane 28 and the lower cladding layer 27 of a Mach-Zehnder modulator 10. The new insulating layer 60 is a thin-film layer of polymer, silicon-nitride ($Si_3N_4$), silicon-oxide ($SiO_2$) or other suitable thin-film insulating material and is applied in accordance with the method disclosed more fully below or other suitable method known in the art.

A DC bias is applied to the second conductive layer 62 by a bias supply 41 of a biasing circuit 40. A signal source 44 is connected to the modulator 10 via a terminating resistor 48. The modulator 10 is terminated by a second terminating resistor 50.

There are several advantages of this arrangement. Practically all the DC bias voltage Vb drops across the device layers (e.g., polymer layers) 25, 26 and 27, because the resistance of the polymer, Rp, is many orders of magnitude higher than the matching resistance of the line (Rp >>Ro). The DC current flow is very small, because it is determined by the large Rp. This eliminates the need for the capacitors 46' and 52' of FIG. 3. The bias source 41 does not interfere with the signal voltage therefore there is no need for the inductor 42' of FIG. 3.

The capacitance of the thin insulating layer 60 should be relatively large compared to the capacitance of device layers 25, 26 and 27. This is easily achieved, because typical device thickness is about 8 microns and the insulating layer can be easily made to be much thinner (e.g. 0.5 micron thick). Also, the dielectric constant of the insulating layer can be made larger than the dielectric constant of the polymer layers.

Generally the requirement is:

$$d1/e1+d2/e2+d3/e3>>d4/e4$$

where 'd1' is the thickness of the upper cladding layer 25, 'd2' is the thickness of the core layer 26, 'd3' is the thickness of the lower cladding layer 27, 'd4' is the thickness of the insulating layer 60, 'e1' is the dielectric constant of the upper cladding layer 25, 'e2' is the dielectric constant of the core layer 26, 'e3' is the dielectric constant of the lower cladding layer 27 and 'e4' is the dielectric constant of the insulating layer 60.

A significant of the inventive design is that the capacitance of the insulating layer 60 is distributed as the capacitance of the polymer layer, (as contrasted to the discrete capacitors of the conventional design of the prior art. Therefore, it performs well in the very high frequency domain.

Figure 6:
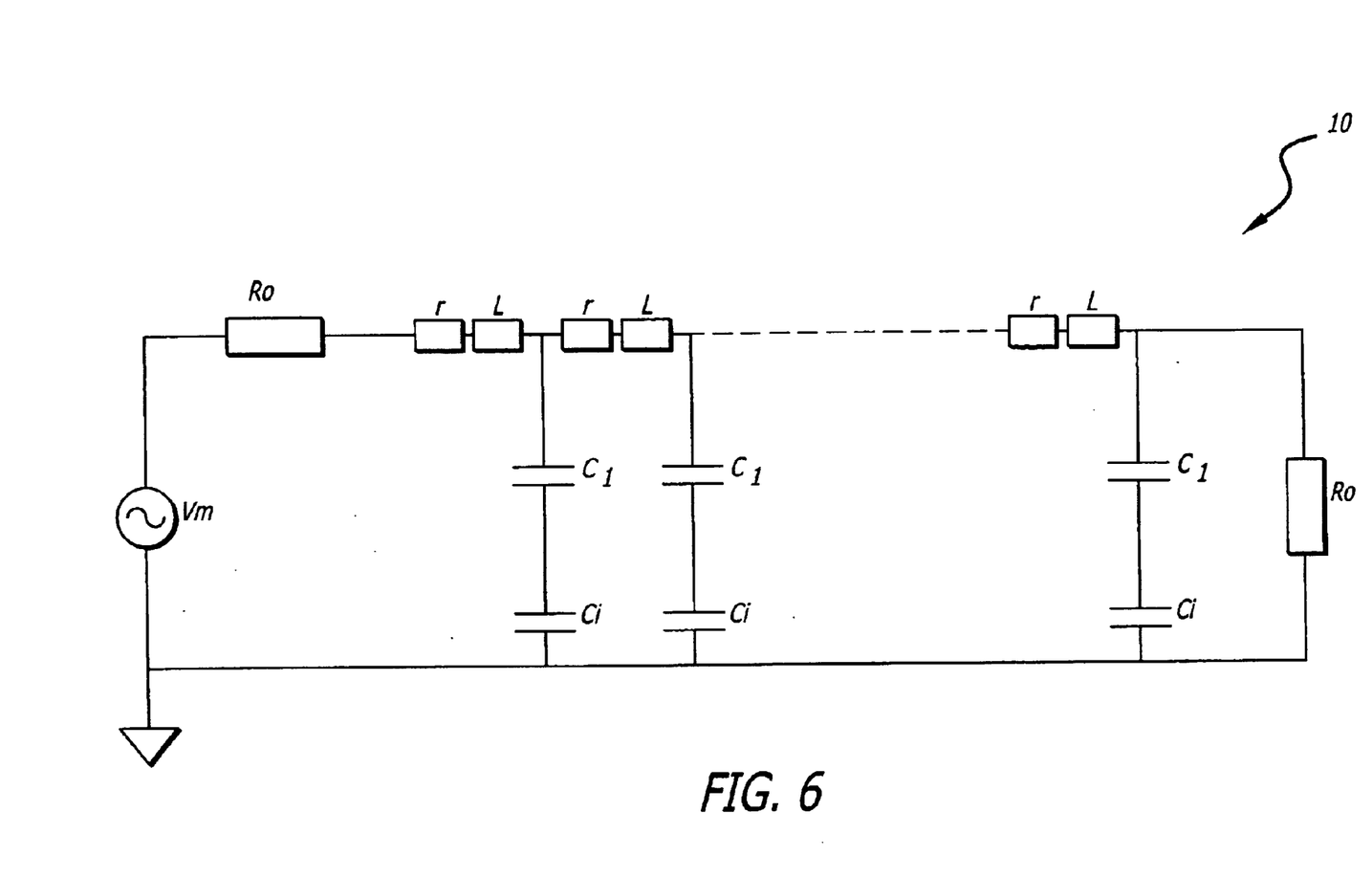
FIG. 6 is a schematic diagram showing an equivalent circuit of the inventive electro-optical modulator of FIG. 5.

FIG. 6 is a schematic diagram showing an equivalent circuit of the inventive electro-optical modulator of FIG. 5. The parameters "r", "L", "$C_1$" and "Ci" represent incremental values of the transmission line of the device. The parameter 'r' represents electrode losses, 'L' represents inductance, '$C_1$' represents capacitance of the layers 25, 26 and 27, and 'Ci' represents the capacitance of the insulator 60. As long as Ci>>$C_1$, the equivalent circuits of the transmission lines of the devices depicted in FIGS. 3 and 5 are the same.

Figure 7A:
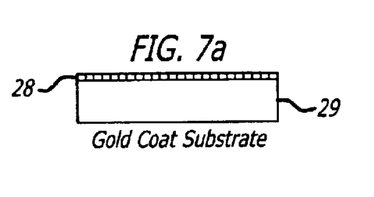
FIGS. 7a–j illustrate a method for fabricating the electro-optical modulator of the present invention.
Figure 7B:
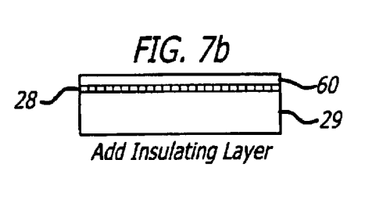
Figure 7C:
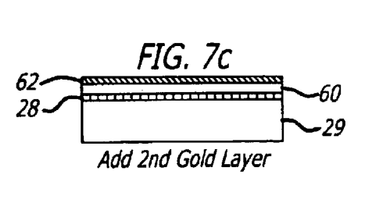
Figure 7D:
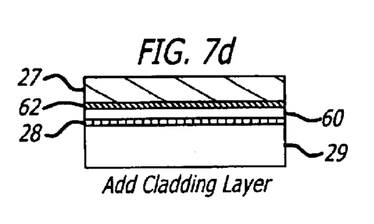
Figure 7E:
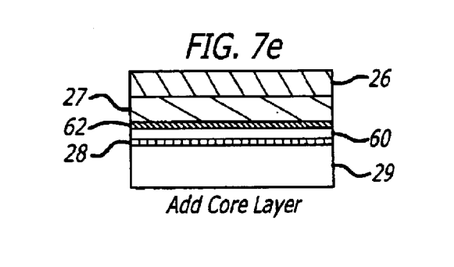
Figure 7F:
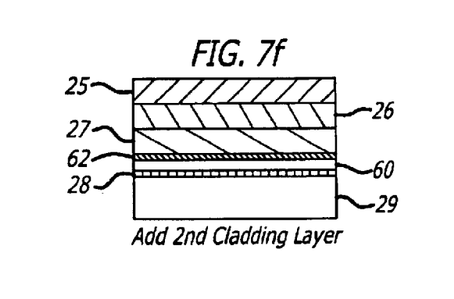
Figure 7G:
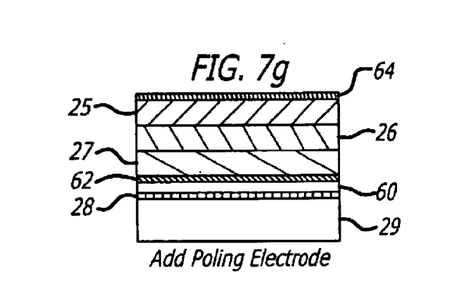
Figures 7H, 7I:
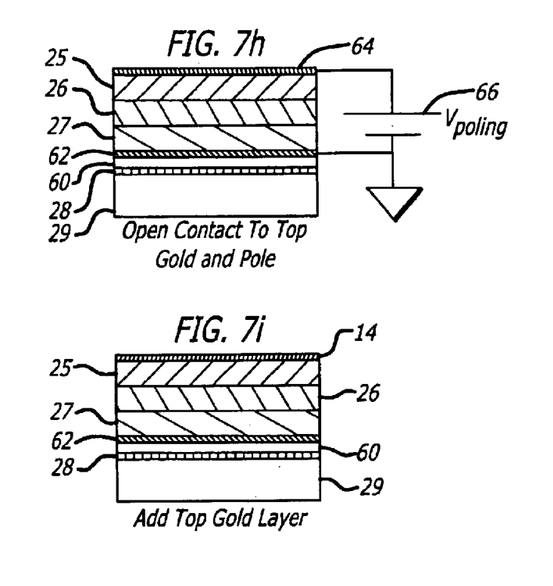
Figure 7J:
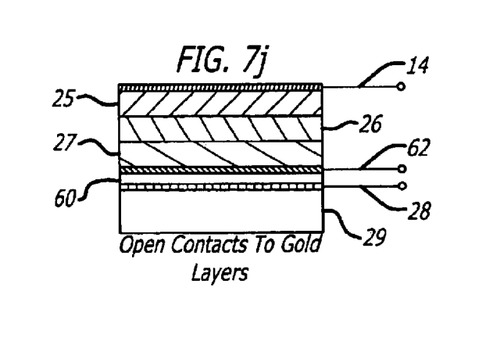

FIGS. 7a–j illustrate a method for fabricating the electro-optical modulator of the present invention. First, a conductive coating (preferably gold) is applied to the substrate 29 to provide the ground plane 28 (FIG. 7a). Next, the insulating layer 60 is applied to the ground plane 28 (FIG. 7b). Next, the conductive layer 62 is disposed on the insulating layer 60 (FIG. 7c). Then, the lower cladding layer 27 is applied over the conductive layer 62 (FIG. 7d). Next, the core layer 26 is applied over the lower cladding layer 27 (FIG. 7e). Then, the upper cladding layer 25 is applied over the core 26 (FIG. 7f). Next, a poling electrode 64 is deposited on the upper cladding layer 25 (FIG. 7g). The poling electrode 64 serves to align the dipoles of the electro-optical material. Next, a potential 66 is applied between the poling electrode 64 and the conductive layer 62 (FIG. 7h). Then, poling electrode 64 is replaced by an upper electrode 14 or 16 (FIG. 7i). Finally, vias are etched to each conductive layer (FIG. 7j). The layers may be applied in accordance with conventional thin-filn fabrication techniques.

The fabrication of the device is very similar to a conventional device with the exception of the step of adding the insulating layer in step 2 (FIG. 7*b*) and the second metal layer in step 3 (FIG. 7*c*). In addition, the poling voltage should be connected to the top metal layer 64 and the middle metal layer 60, as opposed to the conventional connection between the top and bottom metal layers 14' and 28', respectively. Also, in accordance with the present teachings, there is need to have contacts to all three metal layers 14, 28 and 60.

The ideas, the description and the advantages described above apply equally well to the push-pull (FIG. 1) as well as to the complementary (FIG. 1*a*) Mach-Zehnder configurations.

The structural differences are minimal. In case of the push-pull configuration the electrode 62 can be a continuous large electrode, driven by one bias voltage. On the other hand, in case of the complementary configuration a preferred approach is to have two relatively narrow electrodes, aligned with the optical wave-guides and driven by two complementary voltages.

The two configurations described above are of the type called micro-strip. But the disclosed invention applies equally well to the so called coplanar wave-guide configuration.

Thus, the present invention has been described herein with reference to a particular embodiments for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An electro-optical modulator comprising:

a layer of material at least partially transparent to electromagnetic energy, said layer being an optical wave-guide having a first cladding layer, a second cladding layer and a core disposed therebetween;

a first conductive layer disposed on a first surface of said layer of at least partially transparent material;

a second conductive layer disposed on a second surface of said layer of at least partially transparent material;

a layer of insulating material disposed on said second conductive layer; and a third conductive layer disposed on the opposite surface of said layer of insulating material.

2. The invention of claim 1 further including means for applying a modulating signal to said first and said third conductive layers.

3. The invention of claim 2 further including means for applying a bias potential to said second conductive layer.

* * * * *